US012695084B2

(12) United States Patent
Lee et al.

(10) Patent No.: US 12,695,084 B2
(45) Date of Patent: Jul. 28, 2026

(54) NEGATIVE ELECTRODE FOR LITHIUM-ION SECONDARY BATTERY

(71) Applicant: LG Energy Solution, Ltd., Seoul (KR)

(72) Inventors: Su-Min Lee, Daejeon (KR); Se-Mi Park, Daejeon (KR); Sun-Young Shin, Daejeon (KR); Yong-Ju Lee, Daejeon (KR); Jung-Hyun Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 299 days.

(21) Appl. No.: 18/030,741

(22) PCT Filed: Oct. 18, 2021

(86) PCT No.: PCT/KR2021/014516
§ 371 (c)(1),
(2) Date: Apr. 6, 2023

(87) PCT Pub. No.: WO2022/080995
PCT Pub. Date: Apr. 21, 2022

(65) Prior Publication Data
US 2023/0378439 A1      Nov. 23, 2023

(30) Foreign Application Priority Data

Oct. 16, 2020      (KR) ........................ 10-2020-0134444

(51) Int. Cl.
*H01M 4/36* (2006.01)
*H01M 4/131* (2010.01)
(Continued)

(52) U.S. Cl.
CPC ........... *H01M 4/364* (2013.01); *H01M 4/131* (2013.01); *H01M 4/133* (2013.01); *H01M 4/366* (2013.01);
(Continued)

(58) Field of Classification Search
None
See application file for complete search history.

(56) References Cited

U.S. PATENT DOCUMENTS

2016/0126538 A1      5/2016  Hanelt et al.
2017/0012282 A1      1/2017  Kondo et al.
(Continued)

FOREIGN PATENT DOCUMENTS

CN      105340109 A      2/2016
CN      110931742 A      3/2020
(Continued)

OTHER PUBLICATIONS

Written Decision on Registration from Korean Intellectual Property Office (KIPO) dated Dec. 11, 2024 [[Note: The other references cited in the Written Decision are already of record.].
(Continued)

*Primary Examiner* — Zhongqing Wei
(74) *Attorney, Agent, or Firm* — Morgan, Lewis & Bockius LLP

(57) ABSTRACT

Disclosed is a negative electrode for a lithium-ion secondary battery. The negative electrode includes a negative electrode active material layer, which includes a lower layer portion facing the surface of a current collector and an upper layer portion disposed on the top of the lower layer portion, wherein the upper layer portion includes graphite and silicon oxide as negative electrode active materials, the silicon oxide has a sphericity of 0.4-0.8, and the negative electrode active material layer includes a linear conductive material.

21 Claims, 1 Drawing Sheet

100

(51) Int. Cl.

| | |
|---|---|
| *H01M 4/133* | (2010.01) |
| *H01M 4/38* | (2006.01) |
| *H01M 10/0525* | (2010.01) |
| *H01M 4/02* | (2006.01) |
| *H01M 4/62* | (2006.01) |

(52) U.S. Cl.

CPC ....... *H01M 4/386* (2013.01); *H01M 10/0525* (2013.01); *H01M 2004/027* (2013.01); *H01M 4/623* (2013.01)

(56) References Cited

U.S. PATENT DOCUMENTS

| | | | | |
|---|---|---|---|---|
| 2017/0047580 | A1 | 2/2017 | Cho et al. | |
| 2017/0214042 | A1* | 7/2017 | Cho | C01B 33/113 |
| 2018/0212234 | A1 | 7/2018 | Haufe | |
| 2019/0198869 | A1 | 6/2019 | Park et al. | |
| 2019/0233294 | A1 | 8/2019 | Moon et al. | |
| 2020/0176753 | A1 | 6/2020 | Lee et al. | |
| 2020/0243848 | A1 | 7/2020 | Kim et al. | |
| 2020/0274147 | A1 | 8/2020 | Lee et al. | |
| 2020/0403231 | A1* | 12/2020 | Kim | H01M 4/483 |
| 2021/0119200 | A1 | 4/2021 | Nam | |
| 2021/0328225 | A1 | 10/2021 | Kim et al. | |
| 2021/0391570 | A1* | 12/2021 | Han | H01M 4/366 |
| 2022/0344659 | A1* | 10/2022 | Oura | H01M 4/364 |
| 2023/0123455 | A1* | 4/2023 | Hu | H01M 4/364 |
| | | | | 429/231.95 |

FOREIGN PATENT DOCUMENTS

| | | | | | |
|---|---|---|---|---|---|
| CN | 111033824 | A | | 4/2020 | |
| CN | 111095626 | A | | 5/2020 | |
| CN | 111146414 | A | * | 5/2020 | H01M 4/587 |
| CN | 111628141 | A | | 9/2020 | |
| CN | 111771300 | A | | 10/2020 | |
| JP | 2015-018663 | A | | 1/2015 | |
| JP | 2017-062911 | A | | 3/2017 | |
| JP | 2017-514280 | A | | 6/2017 | |
| JP | 2018-530859 | A | | 10/2018 | |
| JP | 2019-016611 | A | | 1/2019 | |
| JP | 2018-125077 | A | | 8/2019 | |
| JP | 2020-087653 | A | | 6/2020 | |
| KR | 10-2013-0116038 | A | | 10/2013 | |
| KR | 20140009927 | A | | 1/2014 | |
| KR | 10-2015-0129867 | A | | 11/2015 | |
| KR | 10-2018-0023088 | A | | 3/2018 | |
| KR | 10-2018-0035915 | A | | 4/2018 | |
| KR | 10-2019-0064480 | A | | 6/2019 | |
| KR | 10-2019-0065172 | A | | 6/2019 | |
| KR | 10-2019-0091411 | A | | 8/2019 | |
| KR | 10-2019-0134064 | A | | 12/2019 | |
| KR | 10-2020-0038168 | A | | 4/2020 | |
| KR | 10-1550781 | B1 | | 9/2025 | |
| WO | 2020050661 | A1 | | 3/2020 | |
| WO | WO-2022012477 | A1 | * | 1/2022 | ........ H01M 10/0525 |

OTHER PUBLICATIONS

Office Action issued in corresponding Japanese Patent Application No. 2023-523168, dated May 20, 2024. (Note: JP 2018-125077 A was previously cited).

The extended European Search Report (EESR) dated Oct. 8, 2024, issued in corresponding EP Patent Application No. 21880641.2. (Note: KR 10-2020-0038168 A was previously cited).

International Search Report (with translation) and Written Opinion dated Jan. 25, 2022, for corresponding International Patent Application No. PCT/KR2021/014516.

Office Action issued in corresponding Korean Patent Application No. 10-2021-0138854, dated Sep. 23, 2024. (Note: KR 10-2019-0065172 A was previously cited).

Extended European Search Report dated Jul. 7, 2025 issued in the corresponding European Patent Application No. 25167939.5. Note: CN 111628141 A, CN 111146414 A, and KR 10-2020-0038168 A already submitted.).

Office Action dated Dec. 6, 2025 issued in the corresponding Chinese Patent Application No. 202510408089.3. (Note: CN 111146414 A, and CN 111628141 A already submitted.).

Office Action dated Dec. 31, 2025 issued in the corresponding Indian Patent Application No. 202317029428. (Note: KR 10-2020-0038168 A, and JP 2018125077 A1 already submitted.).

Office Action dated Dec. 11, 2025 issued in the corresponding Chinese Patent Application No. 202180066796.9. (Note: CN 111095626 A, CN 106233509 A, and CN 111146414 A already submitted.).

\* cited by examiner

100
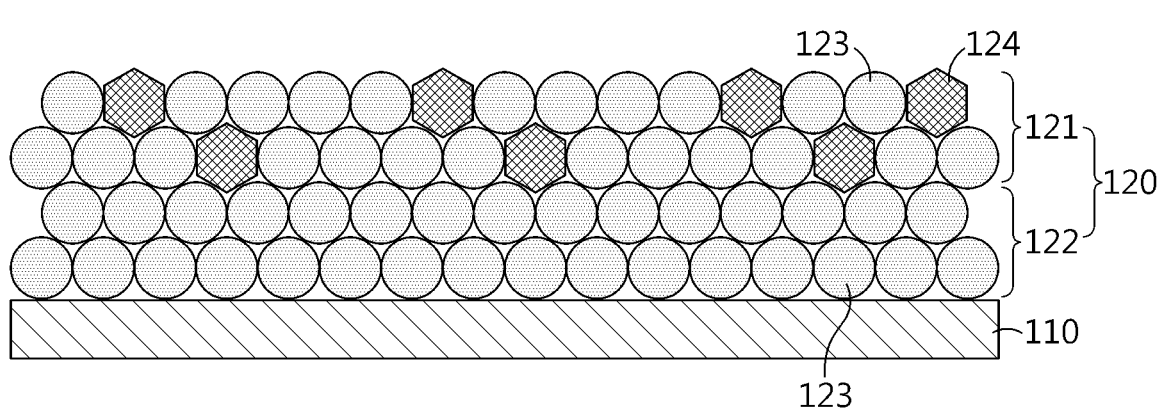

NEGATIVE ELECTRODE FOR LITHIUM-ION SECONDARY BATTERY

TECHNICAL FIELD

The present application claims priority to Korean Patent Application No. 10-2020-0134444 filed on Oct. 16, 2020 in the Republic of Korea. The present disclosure relates to a negative electrode for a lithium-ion secondary battery, and a secondary battery including the same. Particularly, the present disclosure relates to a negative electrode which can be used effectively in a battery for quick charging, and a secondary battery including the same.

BACKGROUND ART

As technical development and needs for mobile instruments have been increased, secondary batteries that are rechargeable and can be downsized and provided with high capacity have been increasingly in demand. Recently, application of secondary batteries is realized as power sources for hybrid electric vehicles (HEV) and electric vehicles (EV). Therefore, many studies have been conducted about secondary batteries capable of meeting various needs. Particularly, lithium secondary batteries having a high energy density, a high discharge voltage and a high output have been increasingly in demand. It is required for a lithium secondary battery used in electric vehicles, or the like, to realize a high energy density and high output within a short time and to be used for 10 years or more under a severe condition including repetition of charge/discharge at high current for a short time. Therefore, it is essentially required for such a lithium secondary battery to have significantly higher output characteristics and long-term life characteristics, as compared to the conventional compact lithium secondary batteries.

Particularly, recently developed electric vehicles are provided with a quick charging mode and slow charging mode to maximize the convenience of the users. It is essentially required to charge a high-energy density lithium secondary battery at a significantly high current density in order to charge the battery at a high rate. On the other hand, when charging a lithium-ion battery at a high current density, over-voltage ($<0$ V vs Li/Li$^+$) is generated in the short term on the surface of a negative electrode, thereby accelerating lithium metal deposition and electrolyte decomposition, resulting in degradation of the life of the battery. To develop a battery causing no degradation of life even in the case of quick charging, it is essentially required to develop a negative electrode capable of accepting lithium ions at a higher rate.

In addition, fundamental performance characteristics, such as capacity, output and life, of a lithium secondary battery are affected significantly by its negative electrode active material. To maximize the performance of a battery, it is required for the negative electrode active material to show an electrochemical reaction potential close to that of lithium metal, to have high reversibility of reaction with lithium ions, and to provide a high diffusion rate of lithium ions in the active material. As materials meeting such needs, graphite and silicon materials have been used frequently. Graphite-based negative electrode active materials are disadvantageous in that they may be deteriorated (in the case of natural graphite) with ease during charge/discharge or have low capacity. Silicon-based negative electrode active materials have a higher capacity as compared to carbonaceous materials, but undergo a large change in volume during charge/discharge. There is a need for considering combined use of a carbonaceous material with a silicon material in order to make up for each other's shortcomings.

DISCLOSURE

Technical Problem

The present disclosure is designed to solve the problems of the related art, and therefore the present disclosure is directed to providing a negative electrode including a negative electrode active material layer having a dual layer structure. The present disclosure is also directed to providing a negative electrode wherein the upper layer portion of the negative electrode active material layer includes SiO satisfying a specific range of sphericity as a negative electrode active material. Meanwhile, other objects and advantages of the present disclosure may be understood from the following detailed description. In addition, it will be easily understood that the objects and advantages of the present disclosure may be realized by the means shown in the appended claims and combinations thereof.

Technical Solution

According to an embodiment of the present disclosure, there is provided a negative electrode for a lithium-ion secondary battery, including a negative electrode current collector, and a negative electrode active material layer containing a negative electrode active material and disposed on at least one surface of the negative electrode active material, wherein the negative electrode active material layer includes a lower layer portion facing the current collector surface and an upper layer portion disposed on the top of the lower layer portion, the lower layer portion includes graphite as a negative electrode active material, the upper layer portion includes graphite and silicon oxide as negative electrode active materials, the silicon oxide has a sphericity of 0.4-0.8, and the negative electrode active material layer includes a linear conductive material.

According to the second embodiment of the present disclosure, there is provided the negative electrode for a lithium-ion secondary battery as defined in the first embodiment, wherein the lower layer portion includes graphite in an amount of 90 wt % or more based on 100 wt % of the negative electrode active material.

According to the third embodiment of the present disclosure, there is provided the negative electrode for a lithium-ion secondary battery as defined in the first or the second embodiment, wherein the upper layer portion includes graphite and silicon oxide at a weight ratio of 70:30-99:1.

According to the fourth embodiment of the present disclosure, there is provided the negative electrode for a lithium-ion secondary battery as defined in any one of the first to the third embodiments, wherein the silicon oxide includes at least one compound represented by the following Chemical Formula 1:

$$SiO_x \qquad \text{[Chemical Formula 1]}$$

wherein x is equal to or more than 0 and less than 2.

According to the fifth embodiment of the present disclosure, there is provided the negative electrode for a lithium-ion secondary battery as defined in the fourth embodiment, wherein x is 0.5-1.5.

According to the sixth embodiment of the present disclosure, there is provided the negative electrode for a lithium-ion secondary battery as defined in any one of the first to the fifth embodiments, wherein the silicon oxide has a particle diameter ($D_{50}$) of 3-10 μm.

According to the seventh embodiment of the present disclosure, there is provided the negative electrode for a lithium-ion secondary battery as defined in any one of the first to the sixth embodiments, wherein the silicon oxide includes a metal distributed on the surface of the silicon oxide particles, inside of the silicon oxide particles, or on the surface and inside of the silicon oxide particles, and the metal is at least one selected from Li, Mg and Al.

According to the eighth embodiment of the present disclosure, there is provided the negative electrode for a lithium-ion secondary battery as defined in any one of the first to the seventh embodiments, wherein the linear conductive material includes at least one selected from single-walled carbon nanotubes (SWCNTs), multi-walled carbon nanotubes (MWCNTs) and graphene.

According to the ninth embodiment of the present disclosure, there is provided a lithium-ion secondary battery including the negative electrode as defined in any one of the first to the eighth embodiments.

Advantageous Effects

The secondary battery using the negative electrode according to the present disclosure provides improved life characteristics and quick charging characteristics.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

The FIGURE is a sectional view illustrating the negative electrode according to an embodiment of the present disclosure.

FORM FOR IMPLEMENTATION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'top, 'bottom', 'right', 'left', 'front', 'rear', 'inward' and 'outward' show the directions in the drawings to which they are referred, or the direction toward the geometrical center of the corresponding apparatus, system and members thereof and the direction away from the same, respectively.

The present disclosure relates to a negative electrode for an electrochemical device, such as a negative electrode for a lithium-ion secondary battery.

According to an embodiment of the present disclosure, the negative electrode includes: a negative electrode current collector; and a negative electrode active material layer disposed on at least one surface of the negative electrode current collector. The negative electrode active material layer includes a first layer (lower layer portion) formed on the top of the negative electrode current collector and a second layer (upper layer portion) formed on the top of the first layer. Each of the first layer and the second layer independently includes a negative electrode active material, a conductive material and a binder resin.

The first layer includes a negative electrode active material, and the negative electrode active material may be present in an amount of 90 wt % or more based on 100 wt % of the first layer. The negative electrode active material includes graphite. According to an embodiment of the present disclosure, the first layer includes graphite in an amount of 90 wt % or more, preferably 95 wt % or more, based on 100 wt % of the negative electrode active material. According to an embodiment of the present disclosure, the negative electrode active material of the first layer may include graphite alone.

The second layer includes a negative electrode active material, and the negative electrode active material may be present in an amount of 90 wt % or more based on 100 wt % of the second layer. The negative electrode active material may include graphite and a silicon-based active material, and the weight ratio of the graphite to the silicon-based active material is 70:30-99:1. According to an embodiment of the present disclosure, the silicon-based active material may include silicon oxide.

Meanwhile, according to an embodiment of the present disclosure, the silicon-based active material may include at least one compound represented by the following Chemical Formula 1:

$$SiO_x \qquad \text{[Chemical Formula 1]}$$

wherein $0 \le x < 2$. In Chemical Formula 1, $SiO_2$ (x=2 in Chemical Formula 1) does not react with lithium ions and cannot store lithium. Thus, x is preferably less than 2. Particularly, $0.5 \le x \le 1.5$ in terms of the structural stability of an electrode active material.

Meanwhile, according to an embodiment of the present disclosure, the silicon-based active material may further include a metal distributed on the surface of the silicon oxide particles, inside of the silicon oxide particles, or on the surface and inside of the silicon oxide particles. The metal may be contained in the silicon-based active material so that it may be distributed on the surface and/or inside of the silicon-based active material to reduce the proportion of an irreversible phase (e.g. $SiO_2$) and to increase the efficiency of the active material. The metal may be at least one selected from Li, Mg and Al, preferably, at least one selected from Li and Mg, and more preferably, Mg in terms of realization of a high effect of preventing damages of the silicon-based oxide particles and improvement of the life characteristics of the negative electrode active material resulting from the low reactivity with water. The metal may be present in the silicon-based active material in an amount of 0.1-25 wt %, preferably 3-15 wt %. Within the above-defined range, it is possible to prevent degradation of capacity, while increasing the efficiency of the active material.

The FIGURE is a schematic sectional view illustrating the negative electrode 100 according to the present disclosure. The negative electrode includes a negative electrode active material layer 120 including a lower layer portion 122 and an upper layer portion 121 disposed successively on the surface of copper foil as a current collector 110, wherein the upper layer portion includes a silicon-based active material (e.g. silicon oxide) 124 as a negative electrode active material. In the FIGURE, drawing numeral 123 represents a carbonaceous negative electrode active material, such as graphite.

Meanwhile, according to an embodiment of the present disclosure, the silicon-based active material may further include a carbon coating layer totally or partially covering the surfaces of the silicon-based particles. The carbon coating layer may function as a protective layer which inhibits volumetric swelling of the silicon-based particles and prevents side reactions with an electrolyte. The carbon coating layer may be present in an amount of 0.1-10 wt %, preferably 3-7 wt % in the silicon-bases active material. Within the above-defined range, the carbon coating layer preferably prevents side reactions with an electrolyte, while controlling volumetric swelling of the silicon-based particles sufficiently.

In addition, the silicon-based active material may have a particle diameter ($D_{50}$) of 3-10 μm. When the particle diameter ($D_{50}$) is less than 3 μm, the silicon-based active material has a large specific surface area and an increased area for reaction with an electrolyte to cause an increase in a possibility of side reactions with an electrolyte during charge/discharge, resulting in degradation of battery life. On the other hand, when the particle diameter is larger than 10 μm, the active material particles undergo a large change in volume caused by volumetric swelling/shrinking during charge/discharge to cause degradation, such as breakage or cracking, of the active material particles, resulting in the problem of degradation of battery performance.

In addition, according to the present disclosure, the silicon-based active material, particularly, silicon oxide may have a sphericity of 0.4 or more. Independently from this or in combination with this, the sphericity may be 0.85 or less, or 0.80 or less. When the sphericity is smaller than 0.4, a change in volume caused by charge/discharge cannot appear uniformly in the particles, and a larger extent of stress may be applied to a specific portion so that deterioration of the active material particles may be accelerated. If the sphericity is larger than 0.85, the contact area between particles may be reduced to cause degradation of electrical conductivity characteristics.

As the sphericity approaches 1, the particles may have a shape close to a spherical shape. The sphericity may be defined as the ratio (Lb/La) of the short axis length (Lb)/ longer axis length (La) of particles. According to an embodiment, the sphericity may be determined through a particle shape analyzer (e.g. Qicpic-Lixell, Sympatec GmbH). Particularly, accumulated distribution of particles is derived through a particle shape analyzer, and the sphericity corresponding to 50% of distribution from particles having a larger sphericity may be determined as the sphericity of the particles. According to an embodiment of the present disclosure, the sphericity may be calculated according to the following Formula 1, and more particularly, Area and Dmax values are derived from the sectional scanning electron microscopic (SEM) image of particles through a computer processing program, and then the sphericity may be calculated according to the following Formula 1.

$$\text{Sphericity} = \frac{4 \, \text{Area}}{\pi D \, \text{max}^2} \qquad \text{[Formula 1]}$$

Meanwhile, according to an embodiment of the present disclosure, the sphericity of the silicon-based active material may be controlled by introducing the active material particles to an air classifying mill (e.g. TC-15, Nisshin Engineering) and changing the rotation speed (rpm) of the mill.

Meanwhile, the graphite may include at least one selected from artificial graphite and natural graphite.

Natural graphite may include crude natural graphite, such as crystalline graphite, flaky graphite or amorphous graphite, or spheronized natural graphite. Crystalline graphite and flaky graphite show substantially perfect crystals, and amorphous graphite shows lower crystallinity. Considering the capacity of an electrode, crystalline graphite or flaky graphite having high crystallinity may be used. For example, crystalline graphite may be used after it is spheronized. In the case of spheronized natural graphite, it may have a particle diameter of 5-30 μm, preferably 10-25 μm.

Herein, in general, artificial graphite may be prepared through a graphitization process including sintering raw materials, such as coal tar, coal tar pitch and petroleum-based heavy oil, at a temperature of 2,500° C. or higher. After such graphitization, the resultant product is subjected to particle size adjustment, such as pulverization and secondary particle formation, so that it may be used as a negative electrode active material.

In general, artificial graphite includes crystals distributed randomly in particles, has a lower sphericity as compared to natural graphite and a slightly sharp shape. Such artificial graphite may be provided in a powdery shape, a flake-like shape, a block-like shape, a sheet-like shape or a rod-like shape, but preferably has an isotropic degree of orientation of crystallites so that the lithium-ion migration distance may be reduced to improve the output characteristics. Considering this, artificial graphite may have a flake-like shape and/or a sheet-like shape.

The artificial graphite used according to an embodiment of the present disclosure includes commercially available mesophase carbon microbeads (MCMBs), mesophase pitch-based carbon fibers (MPCFs), block-like graphitized artificial graphite, powder-like graphitized artificial graphite, or the like. In addition, the artificial graphite may have a particle diameter of 5-30 μm, preferably 10-25 μm.

The specific surface area of the artificial graphite may be determined by the BET (Brunauer-Emmett-Teller) method. For example, the specific surface area may be determined through the BET 6-point method based on nitrogen gas adsorption flow using a porosimetry analyzer (e.g. Belsorp-II mini, Bell Japan Inc.). This will be applied to the determination of the specific surface area of natural graphite as described hereinafter.

The artificial graphite may have a tap density of 0.7-1.1 g/cc, particularly 0.8-1.05 g/cc. When the tap density is less than 0.7 g/cc beyond the above-defined range, the contact area between particles is not sufficient to cause degradation of adhesion and a decrease in capacity per volume. When the tap density is larger than 1.1 g/cc, the tortuosity and electrolyte wettability of an electrode may be decreased to cause degradation of output characteristics during charge/discharge undesirably.

Herein, the tap density may be determined by using an instrument, JV-1000 available from COPLEY Co., introducing 50 g of a precursor to a 100 cc cylinder for tapping with a test instrument, SEISHIN (KYT-4000), and applying tapping thereto 3000 times. This will be applied to the determination of the tap density of natural graphite as described hereinafter.

In addition, the artificial graphite may have an average particle diameter ($D_{50}$) of 8-30 μm, particularly 12-25 μm. When the artificial graphite has an average particle diameter ($D_{50}$) of less than 8 μm, it has an increased specific surface area to cause a decrease in the initial efficiency of a secondary battery, resulting in degradation of the performance of the battery. When the average particle diameter ($D_{50}$) is larger than 30 μm, adhesion may be degraded and packing density may be reduced to cause a decrease in capacity.

For example, the average particle diameter of artificial graphite may be determined by using the laser diffraction method. The laser diffraction method generally allows determination of particle diameter ranging from the submicron region to several millimeters and provides results with high reproducibility and high resolution. The average particle diameter ($D_{50}$) of artificial graphite may be defined as the particle diameter at a point of 50% in the particle diameter distribution. For example, the average particle diameter ($D_{50}$) of artificial graphite may be determined by dispersing artificial graphite in ethanol/water solution, introducing the resultant product to a commercially available laser diffraction particle size analyzer (e.g. Microtrac MT 3000), irradiating ultrasonic waves with a frequency of about 28 kHz thereto at an output of 60 W, and calculating the average particle diameter ($D_{50}$) at a point of 50% in the particle diameter distribution determined by the analyzer.

Meanwhile, according to the present disclosure, the negative electrode may be obtained by forming the lower layer on the top of the negative electrode current collector, and forming the upper layer on the top of the lower layer. The method for forming the lower layer and the upper layer may include a dry-on-wet process or a wet-on-wet process. The dry-on-wet process includes applying the lower layer slurry to the current collector, followed by drying, and then applying the upper layer slurry on the dried lower layer slurry. The wet-on-wet process includes applying the lower layer slurry, applying the upper layer slurry, before the lower layer slurry is dried, and then subjecting the lower layer and the upper layer to a drying step at the same time. For example, according to an embodiment of the present disclosure, the negative electrode may be obtained through a wet-on-wet process. Particularly, two types of slurry may be coated at the same time by using a double slot die, or the like, and carrying out drying to form the lower layer and the upper layer of the negative electrode active material layer.

The method for coating the slurry is not particularly limited, as long as it is used conventionally in the art. For example, a coating process using a slot die, Mayer bar coating process, a gravure coating process, a dip coating process, a spray coating process, etc. may be used.

In the method according to an embodiment of the present disclosure, the negative electrode current collector is not particularly limited, as long as it has conductivity, while not causing any chemical change in the corresponding battery. For example, copper, stainless steel, aluminum, nickel, titanium, baked carbon, copper or stainless steel surface-treated with carbon, nickel, titanium, silver, etc., aluminum-cadmium alloy, or the like, may be used.

Although the current collector is not particularly limited in its thickness, it may have a currently used thickness of 3-500 μm.

Particular examples of the binder include various types of binder polymers, such as polyvinylidene fluoride-co-hexafluoropropylene (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, styrene butadiene rubber (SBR), fluoro-rubber, various copolymers, or the like.

The solvent may include N-methyl-2-pyrrolidone, acetone, water, or the like.

The conductive material is not particularly limited, as long as it causes no chemical change in the corresponding battery and has conductivity. Particular examples of the conductive material include: carbon black, such as carbon black, acetylene black, Ketjen black, channel black, furnace black, lamp black or thermal black; conductive fibers, such as carbon fibers or metallic fibers; carbon nanotubes (CNTs), such as single-walled carbon nanotubes (SWCNTs) and multi-walled carbon nanotubes (MWCNTs); graphene; metal powder, such as fluorocarbon, aluminum or nickel powder; conductive whisker, such as zinc oxide or potassium titanate; conductive metal oxide, such as titanium oxide; conductive materials, such as polyphenylene derivatives, or the like.

Meanwhile, according to an embodiment of the present disclosure, the upper layer portion preferably includes at least one linear conductive material, such as SWCNT, MWCNT and graphene, making linear contact or surface contact. Such a linear conductive material may have a length of 0.5-100 μm. For example, the SWCNT may have an average length of 2-100 μm, and the MWCNT may have an average length of 0.5-30 μm. Meanwhile, the linear conductive material may have a sectional diameter of 1-70 nm. The electrode active material particles having a high sphericity are present in the upper layer according to the present disclosure, and thus the contact area between the particles may be reduced. Therefore, it is possible to ensure a conductive channel between the particles sufficiently by using such a conductive material capable of linear contact or surface contact.

According to an embodiment of the present disclosure, each of the upper layer portion and the lower layer portion may further include a thickener, if necessary. Particular examples of the thickener may include at least one selected from carboxymethyl cellulose (CMC), carboxyethyl cellulose, polyvinyl pyrrolidone, or the like.

Meanwhile, according to an embodiment of the present disclosure, the dried negative electrode may be further subjected to a pressurizing step. The pressurizing step may be carried out by using a method, such as roll pressing, used conventionally in the art. Meanwhile, the pressurizing step may be carried out under heating. For example, the pressurizing step may be carried out under a pressure of 1-20 MPa at a temperature of 15-30° C.

In another aspect of the present disclosure, there is provided a lithium secondary battery including the negative electrode obtained as described above. Particularly, the lithium secondary battery may be obtained by injecting a lithium salt-containing electrolyte to an electrode assembly including a positive electrode, the negative electrode as described above and a separator interposed between both electrodes.

The positive electrode may be obtained by mixing a positive electrode active material, a conductive material, a binder and a solvent to form slurry, and coating the slurry directly onto a metal current collector, or casting the slurry onto a separate support, peeling a positive electrode active material film from the support and laminating the film on a metal current collector.

The positive electrode active material used in the positive electrode active material layer may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x \leq 0.5$, $0 \leq y < 0.5$, $0 \leq z < 0.5$, and $0 \leq x+y+z \leq 1$), or a mixture of at least two of them. According to an embodiment of the present disclosure, the positive electrode active material may include a lithium cobalt oxide and/or lithium nickel cobalt manganese oxide.

Meanwhile, the same conductive material, binder and solvent as used for manufacturing the negative electrode may be used.

The separator may be a conventional porous polymer film used conventionally as a separator. For example, the porous polymer film may be a porous polymer film made of a polyolefinic polymer, such as ethylene homopolymer, propylene homopolymer, ethylene-butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte has ion conductivity, and includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN^-$, and $(CF_3CF_2 SO_2)_2N^-$. According to an embodiment of the present disclosure, the lithium salt may have a concentration of 0.8-1.4 M in the electrolyte.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonate is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, a cylindrical battery casing or a prismatic battery casing, and then injecting the electrolyte thereto. In a variant, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or cable type battery.

The lithium secondary battery according to the present disclosure may be used for a battery cell used as a power source for a compact device, and may be used preferably as a unit battery for a medium- or large-size battery module including a plurality of battery cells. Particular examples of medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

(1) Preparation of Negative Electrode

A negative electrode active material, a binder resin and a conductive material were introduced to acetone to prepare slurry for a lower layer. In addition, a negative electrode active material (carbonaceous material and silicon oxide material), a binder resin and a conductive material were introduced to acetone to prepare slurry for an upper layer. Then, the slurry for a lower layer was applied to the surface of a negative electrode current collector (copper foil, thickness 5 μm), the slurry for an upper layer was applied thereto right after the application of the slurry for a lower layer, and hot air drying was carried out to obtain an electrode. The resultant electrode had a total thickness of 80 µm, the upper layer had a thickness of about 40 µm, and the lower layer had a thickness of about 40 µm. The electrode had a porosity of about 30 vol %. The ingredients and contents thereof used for manufacturing the negative electrode are shown in the following Table 1 and Table 2.

TABLE 1

| | | | Ex. 1 | Ex. 2 | Ex. 3 | Ex. 4 | Ex. 5 |
|---|---|---|---|---|---|---|---|
| Upper layer portion | Negative electrode active material | Ingredient 1 | Artificial graphite ($D_{50}$ 20 µm) | Artificial graphite ($D_{50}$ 20 µm) | Artificial graphite ($D_{50}$ 20 µm) | Artificial graphite ($D_{50}$ 20 µm) | Artificial graphite ($D_{50}$ 20 µm) |
| | | Ingredient 2 SiO — Sphericity | 0.5 | 0.6 | 0.8 | 0.5 | 0.8 |
| | | Particle diameter ($D_{50}$) (µm) | 5 | 5 | 5 | 5 | 5 |
| | | Ingredient 1:Ingredient 2 Weight ratio | 90:10 | 90:10 | 90:10 | 90:10 | 90:10 |
| | Binder (including Thickener (CMC)) | | Styrene butadiene rubber (SBR) | SBR | SBR | SBR | SBR |
| | Conductive material | | SWCNT | SWCNT | SWCNT | MWCNT | MWCNT |
| | Active material:Binder:Conductive material, weight ratio | | 96.95:3:0.05 | 96.95:3:0.05 | 96.95:3:0.05 | 96.5:3:0.5 | 96.5:3:0.5 |
| Lower layer portion | Negative electrode active material | | Artificial graphite ($D_{50}$ 20 µm) Natural graphite ($D_{50}$ 15 µm) (5:5 weight ratio mixing) | Artificial graphite ($D_{50}$ 20 µm) Natural graphite ($D_{50}$ 15 µm) (5:5 weight ratio mixing) | Artificial graphite ($D_{50}$ 20 µm) Natural graphite ($D_{50}$ 15 µm) (5:5 weight ratio mixing) | Artificial graphite ($D_{50}$ 20 µm) Natural graphite ($D_{50}$ 15 µm) (5:5 weight ratio mixing) | Artificial graphite ($D_{50}$ 20 µm) Natural graphite ($D_{50}$ 15 µm) (5:5 weight ratio mixing) |
| | Binder (including thickener (CMC)) | | SBR | SBR | SBR | SBR | SBR |
| | Conductive material | | Carbon black | Carbon black | Carbon black | Carbon black | Carbon black |
| | Active material:Binder:Conductive material, weight ratio | | 95:4:1 | 95:4:1 | 95:4:1 | 95:4:1 | 95:4:1 |

TABLE 2

| | | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Upper layer portion | Negative electrode active material | Ingredient 1 | Artificial graphite ($D_{50}$ 20 µm) | Artificial graphite ($D_{50}$ 20 µm) | Artificial graphite ($D_{50}$ 20 µm) | Artificial graphite ($D_{50}$ 20 µm) | Artificial graphite ($D_{50}$ 20 µm) | Artificial graphite ($D_{50}$ 20 µm) |
| | | Ingredient 2 (SiO) — Sphericity | 0.5 | 0.8 | 0.05 | 0.05 | 0.3 | 0.3 |
| | | Particle diameter ($D_{50}$) (µm) | 5 | 5 | 5 | 5 | 5 | 5 |
| | | Ingredient 1:Ingredient 2, weight ratio | 90:10 | 90:10 | 90:10 | 90:10 | 90:10 | 90:10 |
| | Binder (including thickener (CMC)) | | Styrene butadiene rubber (SBR) | SBR | SBR | SBR | SBR | SBR |
| | Conductive material | | Carbon black | Carbon black | SWCNT | MWCNT | Carbon black | SWCNT |
| | Active material:Binder: Conductive material, weight ratio | | 96:3:1 | 96:3:1 | 96.95:3: 0.05 | 96.5:3:0.5 | 96:3:1 | 96.95:3.0: 0.05 |
| Lower layer portion | Negative electrode active material | | Artificial graphite ($D_{50}$ 20 µm) Natural graphite ($D_{50}$ 15 µm) (5:5 weight ratio mixing) | Artificial graphite ($D_{50}$ 20 µm) Natural graphite ($D_{50}$ 15 µm) (5:5 weight ratio mixing) | Artificial graphite ($D_{50}$ 20 µm) Natural graphite ($D_{50}$ 15 µm) (5:5 weight ratio mixing) | Artificial graphite ($D_{50}$ 20 µm) Natural graphite ($D_{50}$ 15 µm) (5:5 weight ratio mixing) | Artificial graphite ($D_{50}$ 20 µm) Natural graphite ($D_{50}$ 15 µm) (5:5 weight ratio mixing) | Artificial graphite ($D_{50}$ 20 µm) Natural graphite ($D_{50}$ 15 µm) (5:5 weight ratio mixing) |

TABLE 2-continued

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Binder (SBR) (including thickener CMC)) | SBR | SBR | SBR | SBR | SBR | SBR |
| Conductive material | Carbon black | Carbon black | Carbon black | Carbon black | Carbon black | Carbon black |
| Active material:Binder: Conductive material, weight ratio | 95:4:1 | 95:4:1 | 95:4:1 | 95:4:1 | 95:4:1 | 95:4:1 |

(2) Manufacture of Battery

Each of the negative electrodes prepared according to Examples 1-5 and Comparative Examples 1-6 was used to manufacture a battery. The negative electrode was cut into a size of 1.7671 cm$^2$, and lithium metal foil was used as a counter electrode. A porous polyethylene film as a separator was interposed between both electrodes, and an electrolyte was injected thereto to obtain a coin-like half-cell. The electrolyte was prepared by introducing 0.5 wt % of vinylene carbonate and 1 M LiPF$_6$ to a mixed solution containing methyl ethyl carbonate (EMC) and ethylene carbonate (EC) at a volume ratio of 7:3.

(3) Evaluation of Life Characteristics (Capacity Retention) and Volumetric Swelling Ratio Each of the batteries according to Examples and Comparative Examples was charged/discharged to evaluate the life characteristics (capacity retention). The results are shown in the following Table 3. Meanwhile, each battery was charged/discharged at 0.1 C. for the first cycle and the second cycle, and at 0.5 C. from the third cycle to the 100$^{th}$ cycle.

Charge condition: constant current (CC)/constant voltage (CV) mode (5 mV/0.005 C current cut-off)

Discharge condition: CC mode (1.5 V)

The capacity retention was calculated by using the following Mathematical Formula 1:

Capacity retention (%)=(Discharge capacity at the 100$^{th}$ cycle/Discharge capacity at the first cycle)×100          [Mathematical Formula 1]

Meanwhile, the volumetric swelling ratio was calculated by using the following Mathematical Formula 2:

Volumetric swelling ratio (%)={(Volume of battery after 100 charge/discharge cycles–Initial volume of battery before carrying out charge/discharge cycles)/Initial volume of battery before carrying out charge/discharge cycles}×100          [Mathematical Formula 2]

TABLE 3

|  | Capacity retention (100$^{th}$ cycle, %) | Volumetric swelling ratio (100$^{th}$ cycle, %) |
|---|---|---|
| Ex. 1 | 93 | 12 |
| Ex. 2 | 94 | 12 |
| Ex. 3 | 97 | 13 |
| Ex. 4 | 91 | 13 |
| Ex. 5 | 95 | 14 |
| Comp. Ex. 1 | 80 | 12 |
| Comp. Ex. 2 | 75 | 14 |
| Comp. Ex. 3 | 89 | 23 |
| Comp. Ex. 4 | 86 | 21 |
| Comp. Ex. 5 | 73 | 15 |
| Comp. Ex. 6 | 88 | 19 |

As can be seen from Table 3, each of the batteries according to Examples 1-5 shows a higher capacity retention as compared to the batteries according to Comparative Examples 1-6. In addition, each of the batteries according to Comparative Examples 1-6 shows a higher volumetric swelling ratio as compared to the batteries according to Examples 1-5. Particularly, in the case of the batteries according to Comparative Examples 3, 4 and 6, each battery has a slightly higher capacity retention but shows a volumetric swelling ratio of 19% or more, and thus undergoes a larger change in volume during repetitive charge/discharge cycles as compared to the batteries according to Examples. Meanwhile, in the case of Comparative Examples 1 and 2, it can be seen that the silicon oxide used in the upper layer has a sphericity similar to the sphericity of the silicon oxide used in Examples 1 and 2, but the negative electrode uses a dot-like conductive material, not a linear conductive material, resulting in a decrease in capacity retention.

What is claimed is:

1. A negative electrode for a lithium-ion secondary battery, comprising:

a negative electrode current collector, and a negative electrode active material layer, wherein the negative electrode active material layer is disposed on at least one surface of the negative electrode current collector, the negative electrode active material layer including:

a lower layer portion facing the at least one surface of the negative electrode current collector and comprising a first negative electrode active material that includes a first graphite and a first conductive material, and an upper layer portion disposed on a top of the lower layer portion and comprising:

a second negative electrode active material that includes a second graphite and silicon oxide, wherein the upper layer portion comprises the second graphite and silicon oxide at a weight ratio range of from 70:30 to 90:10, and a second conductive material, wherein the second conductive material comprises (i) graphene, or (ii) a linear conductive material comprising single-walled carbon nanotubes (SWCNTs), multi-walled carbon nanotubes (MWCNTs), or both, or (iii) a combination of (i) and (ii), wherein the silicon oxide has a particle diameter, D$_{50}$, of 3-10 µm, and wherein the silicon oxide has a sphericity, s, satisfying 0.4≤s<0.8.

2. The negative electrode for a lithium-ion secondary battery according to claim 1, wherein the lower layer portion comprises the first graphite in an amount of 90 wt % or more based on 100 wt % of the first negative electrode active material present in the lower layer portion.

3. The negative electrode for a lithium-ion secondary battery according to claim 1, wherein the silicon oxide comprises at least one compound represented by Chemical Formula 1:

$$SiO_x \qquad \text{[Chemical Formula 1]}$$

wherein x is equal to or more than 0 and less than 2.

4. The negative electrode for a lithium-ion secondary battery according to claim 3, wherein x is 0.5-1.5.

5. The negative electrode for a lithium-ion secondary battery according to claim 1, wherein the silicon oxide comprises a metal including at least one selected from Li, Mg, and Al, and the metal is distributed on surface of silicon oxide particles, inside of the silicon oxide particles, or on the surface and inside of the silicon oxide particles.

6. The negative electrode for a lithium-ion secondary battery according to claim 1, wherein the linear conductive material comprises single-walled carbon nanotubes (SWCNTs) or multi-walled carbon nanotubes (MWCNTs).

7. A lithium-ion secondary battery comprising the negative electrode as defined in claim 1.

8. The negative electrode for a lithium-ion secondary battery according to claim 1, wherein the linear conductive material comprises single-walled carbon nanotubes (SWCNTs).

9. The negative electrode for a lithium-ion secondary battery according to claim 1, wherein the linear conductive material comprises multi-walled carbon nanotubes (MWCNTs).

10. The negative electrode for a lithium-ion secondary battery according to claim 1, wherein the sphericity is calculated according to Formula 1:

$$\text{Sphericity} = \frac{4\,\text{Area}}{\pi\,Dmax^2} \qquad \text{[Formula 1]}$$

where Area and Dmax values are determined by using scanning electron microscopy, where Area is an area of a silicon oxide particle, and where Dmax is a maximum diameter of the silicon oxide particle.

11. The negative electrode for a lithium-ion secondary battery according to claim 1, wherein the first graphite includes an artificial graphite and a natural graphite, and wherein the artificial graphite has an average particle diameter of 8-30 µm.

12. The negative electrode for a lithium-ion secondary battery according to claim 11, wherein the natural graphite has a particle diameter of 5-30 µm.

13. The negative electrode for a lithium-ion secondary battery according to claim 12 wherein the artificial graphite, before mixed with the natural graphite to form the first graphite, has a tap density of 0.7-1.1 g/cc.

14. The negative electrode for a lithium-ion secondary battery according to claim 11, wherein the first graphite includes an artificial graphite and a natural graphite in a ratio of 5:5 by weight.

15. The negative electrode for a lithium-ion secondary battery according to claim 1, wherein the lower layer portion comprises the first graphite in an amount of 95 wt % or more based on 100 wt % of the first negative electrode active material present in the lower layer portion.

16. The negative electrode for a lithium-ion secondary battery according to claim 1, wherein the first conductive material includes carbon black.

17. The negative electrode for a lithium-ion secondary battery according to claim 16, wherein the first conductive material is present in the lower layer portion.

18. The negative electrode for a lithium-ion secondary battery according to claim 1, wherein the second graphite includes artificial graphite that has an average particle diameter of 8-30 µm.

19. The negative electrode for a lithium-ion secondary battery according to claim 1, wherein the upper layer portion comprises the second negative electrode active material in an amount of 90 wt % or more based on 100 wt % of the upper layer portion.

20. The negative electrode for a lithium-ion secondary battery according to claim 1, wherein the upper layer portion comprises the second negative electrode active material in an amount of 96.5 wt % or more based on 100 wt % of the upper layer portion.

21. The negative electrode for a lithium-ion secondary battery according to claim 1, wherein the silicon oxide has a sphericity in a range of 0.4 to 0.6.

*   *   *   *   *